June 4, 1929.  G. W. CAMPBELL  1,716,302
ARTICLE HANDLING MACHINE
Filed Jan. 21, 1926  8 Sheets-Sheet 1
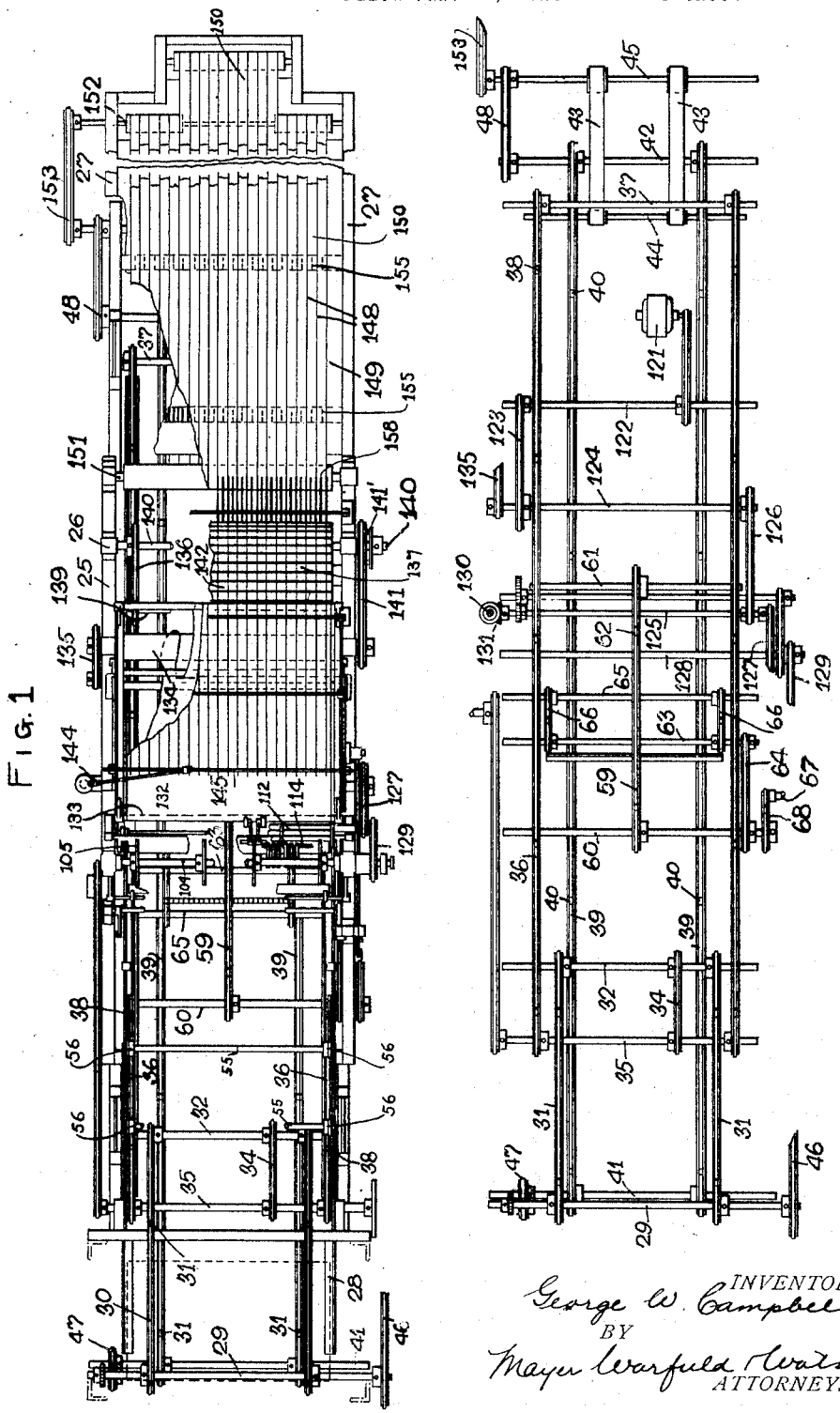
INVENTOR.
George W. Campbell
BY
Mayer Warfield Watson
ATTORNEYS.

June 4, 1929.  G. W. CAMPBELL  1,716,302
ARTICLE HANDLING MACHINE
Filed Jan. 21, 1926   8 Sheets-Sheet 2
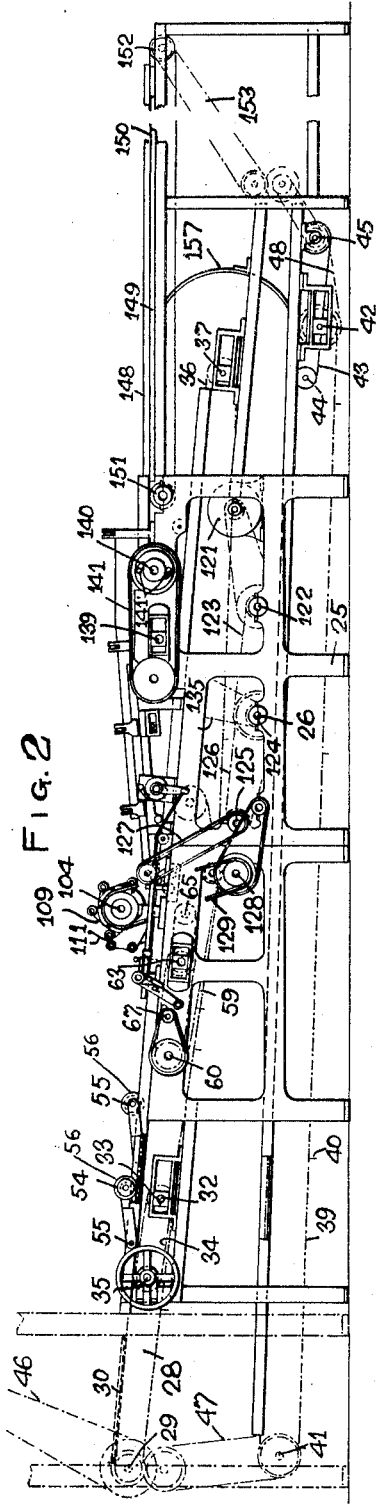
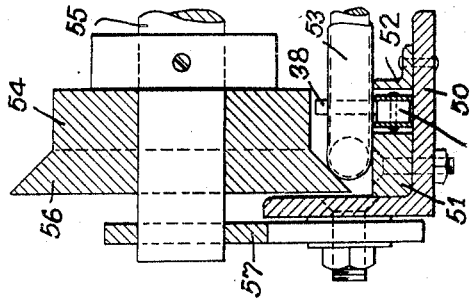
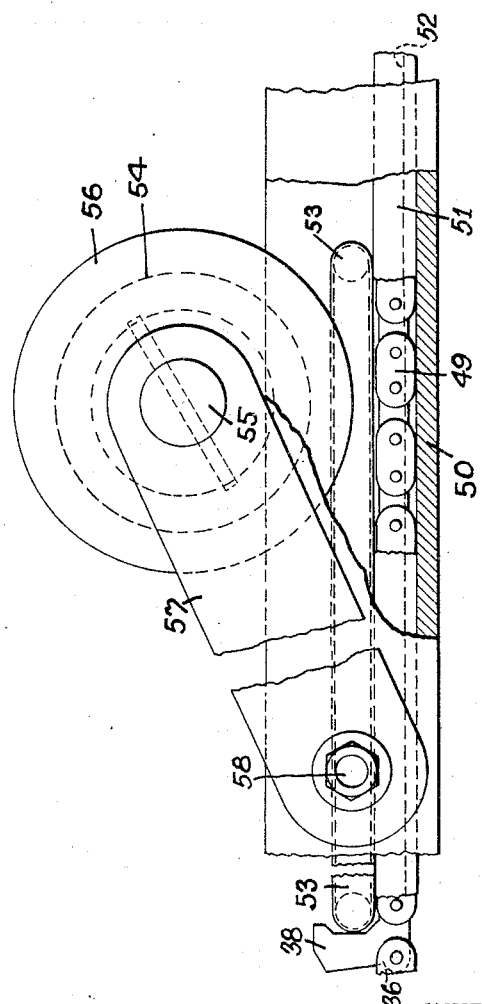
INVENTOR.
George W. Campbell
BY
Mayer, Warfield & Watson
ATTORNEYS.

June 4, 1929. G. W. CAMPBELL 1,716,302
ARTICLE HANDLING MACHINE
Filed Jan. 21, 1926 8 Sheets-Sheet 3
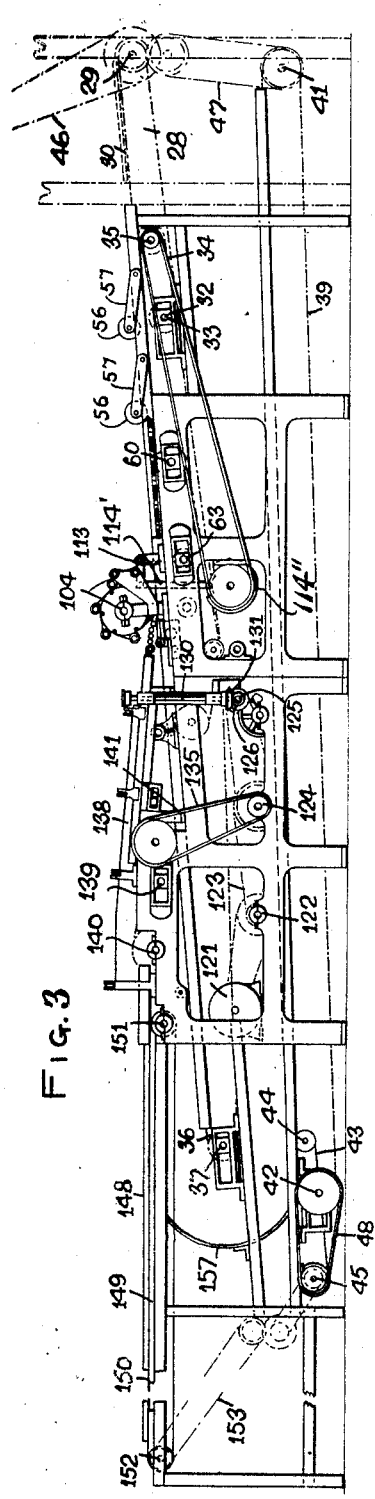
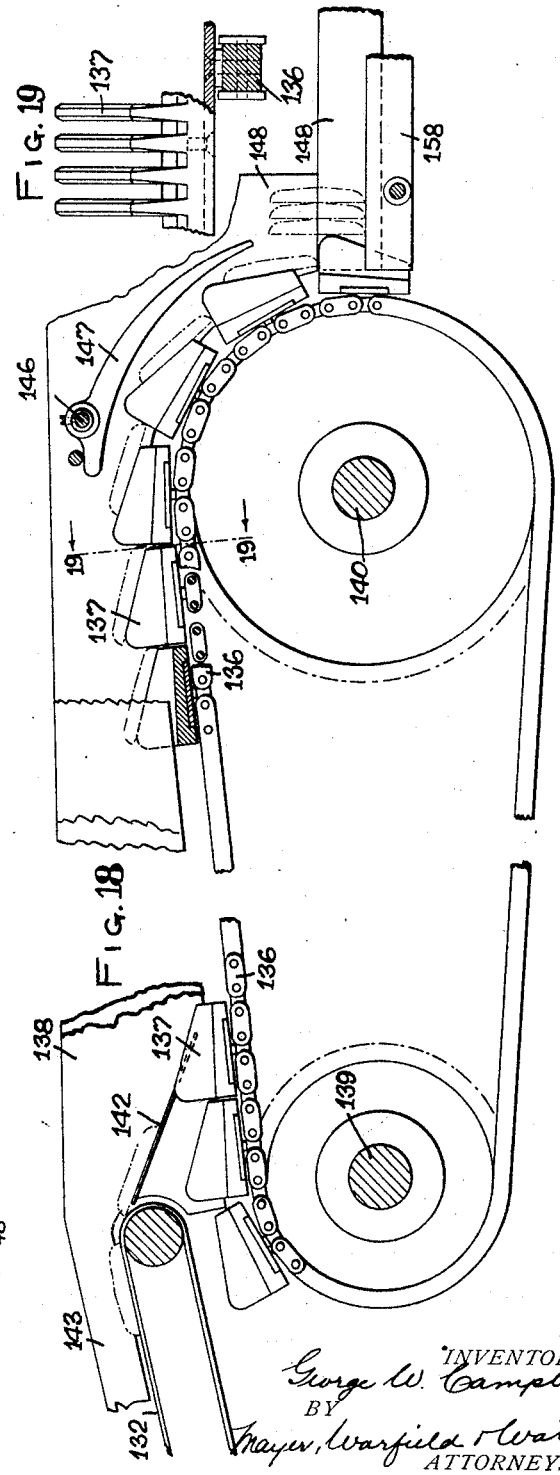
INVENTOR.
George W. Campbell
BY
Mayer, Warfield & Watson
ATTORNEYS.

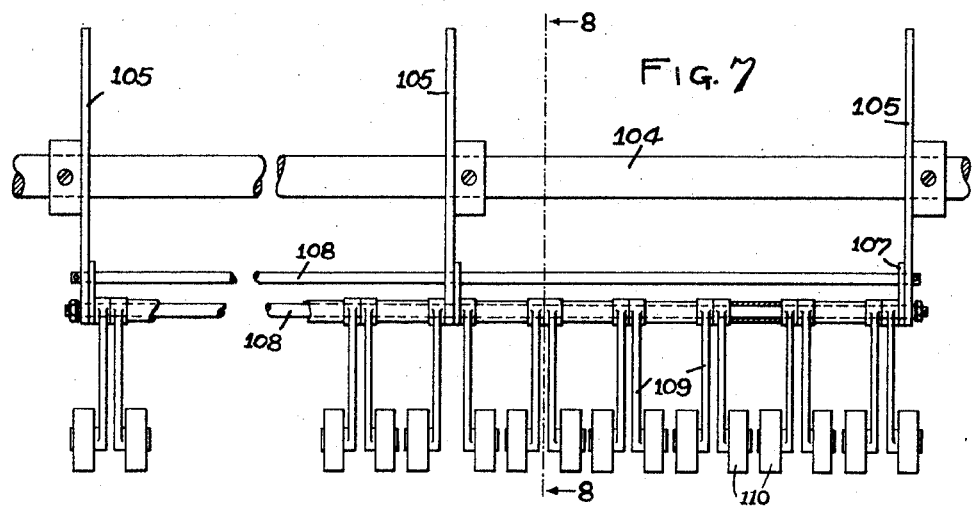
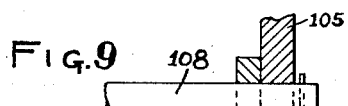
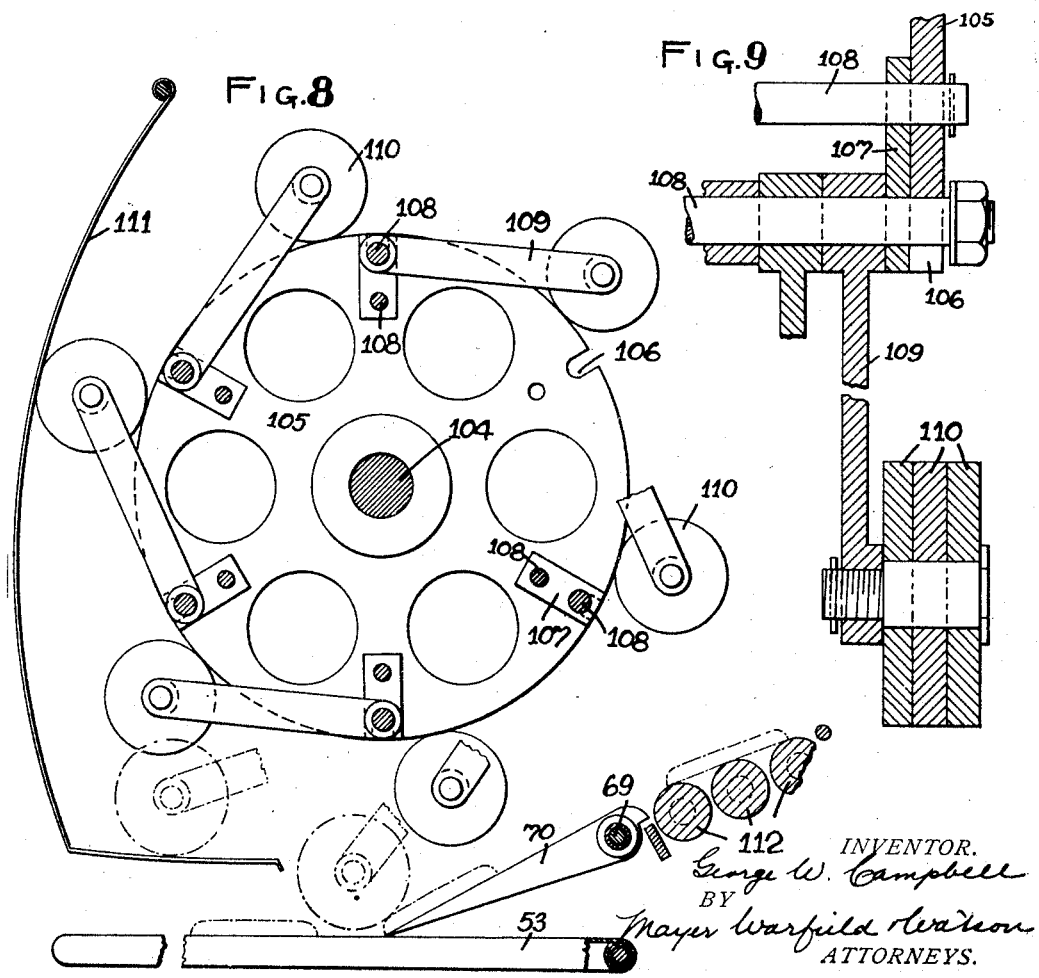

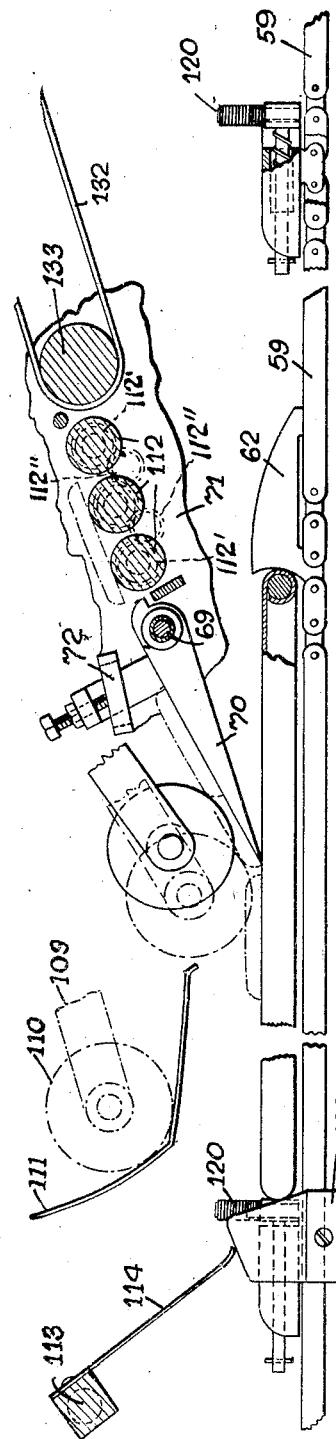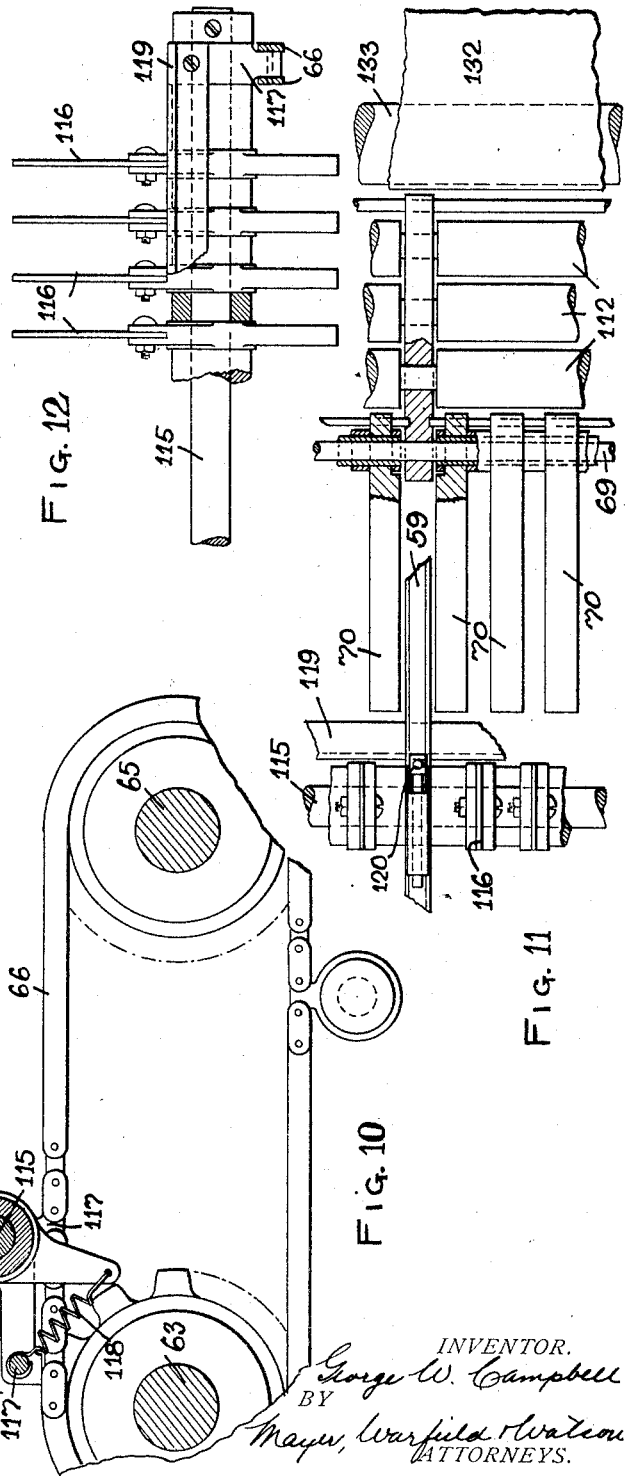

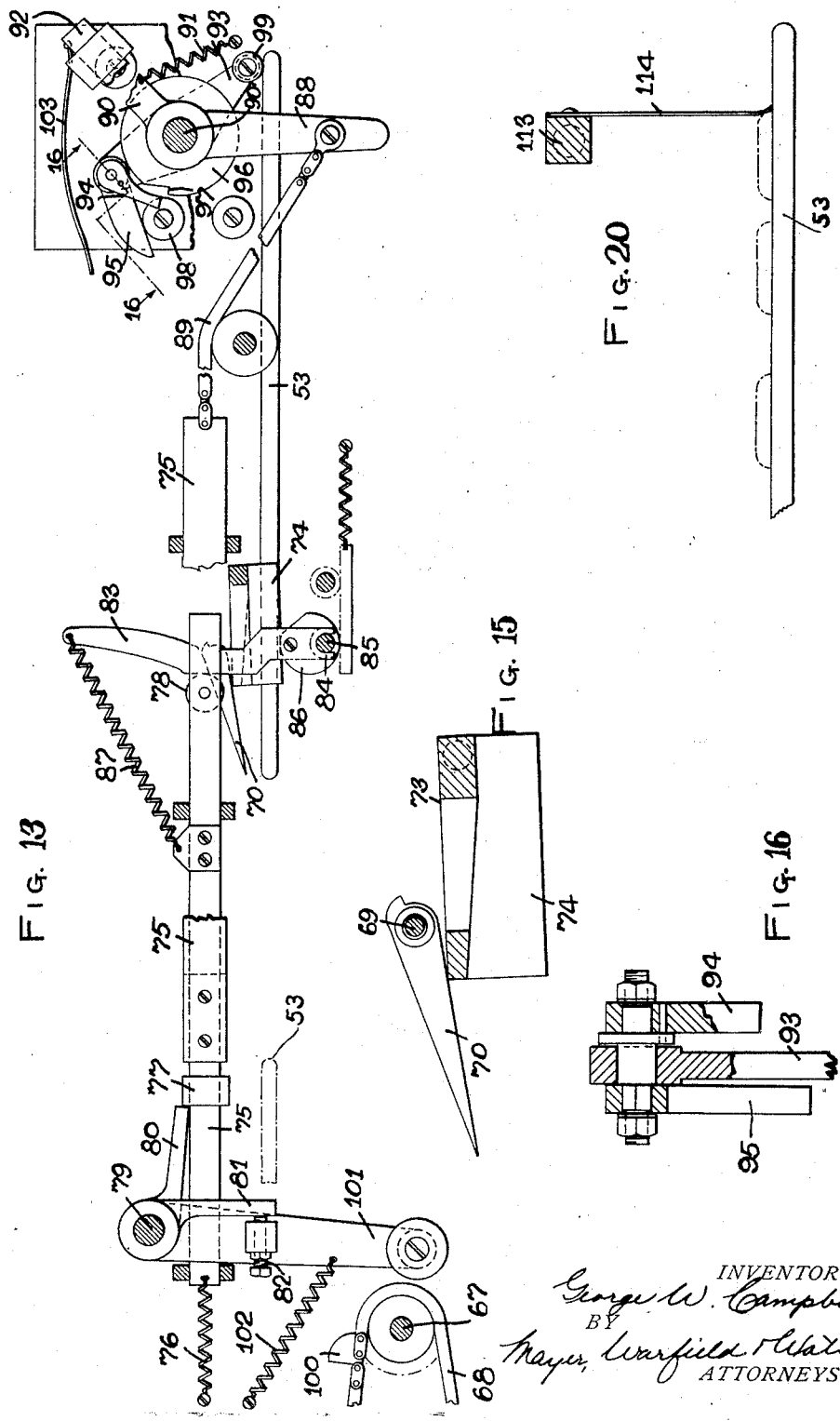

June 4, 1929.                G. W. CAMPBELL                1,716,302
                        ARTICLE HANDLING MACHINE
                        Filed Jan. 21, 1926        8 Sheets-Sheet 7
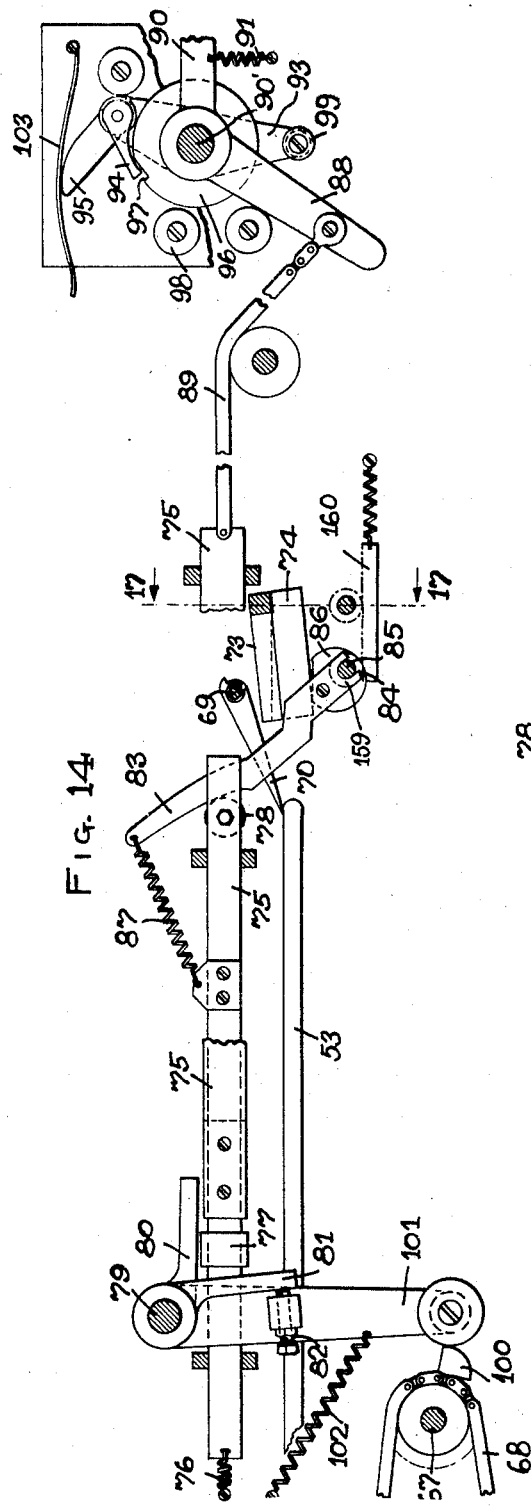
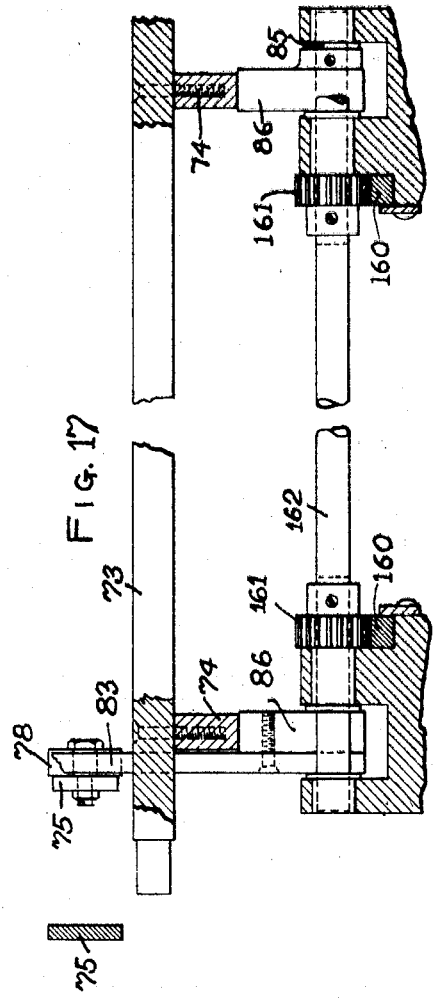
INVENTOR.
George W. Campbell
BY
Mayer, Warfield & Watson
ATTORNEYS.

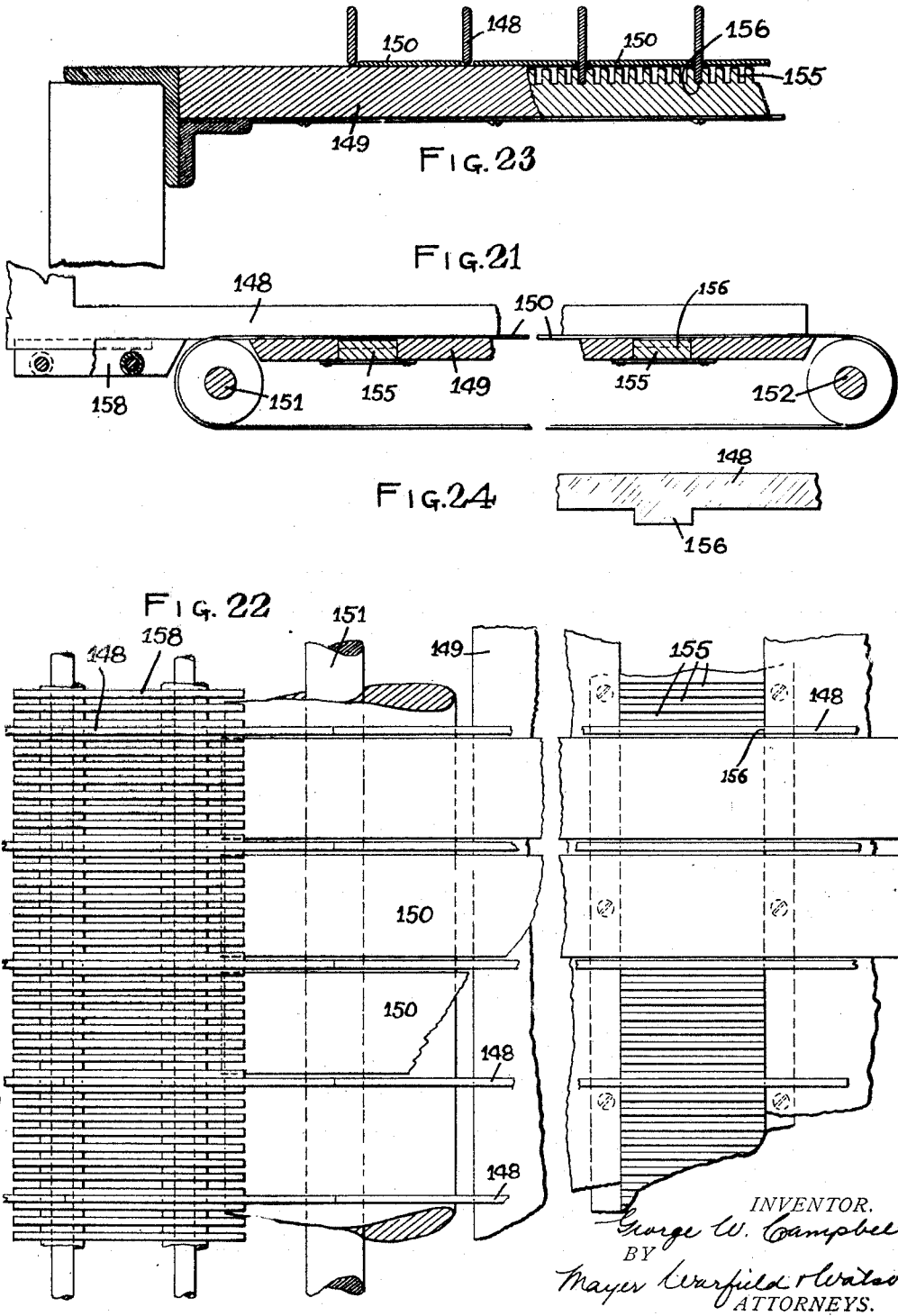

Patented June 4, 1929.

1,716,302

UNITED STATES PATENT OFFICE.

GEORGE WORRINGTON CAMPBELL, OF BROOKLYN, NEW YORK, ASSIGNOR TO NATIONAL BISCUIT COMPANY, OF NEW YORK, N. Y., A CORPORATION OF NEW JERSEY.

ARTICLE-HANDLING MACHINE.

Application filed January 21, 1926. Serial No. 82,664.

This invention relates to an improved article-handling machine, and is particularly intended for use in the baking industry, in which it will be employed to handle crackers, biscuits, etc. in a more efficacious manner than has heretofore been considered practicable.

It is an object of the invention to provide a machine which will efficiently perform the purposes for which it is intended, and in which articles of, for example, the nature aforementioned will be automatically transferred from pans supporting the same and arranged in stacks, this manipulation of the articles being accomplished at a relatively high speed and in large quantities.

A still further object is that of providing a machine of this character the parts of which will be relatively simple in construction and comparatively few in number, so that a machine may be constructed within the terms of the present invention at a relatively small cost and will operate over long periods of time with freedom from mechanical difficulty and adjustment.

A further object is that of furnishing an article-handling machine of the nature aforestated in which the articles will be removed directly from the members supporting the same and be delivered ready for packing.

A still further object is that of furnishing an automatic machine which will eliminate a manual handling of the articles, and initial supporting members therefor, aside from the fact that the machine will return the empty supporting members to any desired station.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For fuller understanding of the nature and objects of the invention reference should be had to the following detailed description taken in connection with the accompanying drawings, in which:

Figure 1 is a plan view of a machine embodying one form of the present invention, certain of the parts being broken away to disclose the underlying construction;

Fig. 2 is a righthand side elevation thereof;

Fig. 3 is a lefthand side elevation;

Fig. 4 is a plan view of the conveying and driving mechanism;

Fig. 5 is a partly sectional fragmentary side elevation of a detail of construction;

Fig. 6 is a transverse sectional view of the parts as shown in Fig. 5;

Fig. 7 is a front elevation of the stripping unit, with all but one set of the operating members removed therefrom;

Fig. 8 is a sectional side elevation of this unit, and showing the relationship of the same to other units, this view being taken along the line 8—8 and in the direction of the arrows in Fig. 7;

Fig. 9 is a fragmentary enlarged sectional view of one of the operating members of this unit;

Fig. 10 is a fragmentary enlarged side view of the apparatus immediately adjacent the unit shown in the preceding views;

Fig. 11 is a fragmentary plan view of these parts, certain of the same being shown in section;

Fig. 12 is a fragmentary partly sectional front view of one of the details of this mechanism;

Fig. 13 is a partly fragmentary side elevation of the mechanism which controls the functioning of the stripping unit and associated apparatus, and showing the position which the picking fingers or teeth assume during their periods of inaction;

Fig. 14 is a view similar to Fig. 13, but showing the thrown or operative position of the parts;

Fig. 15 is a sectional side elevation of the picking or scooping fingers, and showing the same in elevated position;

Fig. 16 is a sectional view taken on the lines 16—16 and in the direction of the arrows of Fig. 13;

Fig. 17 is a transverse sectional view taken along the lines 17—17 and in the directions of the arrows in Fig. 14;

Fig. 18 is a partly sectional side elevation of the mechanism which initiates the stacking operation;

Fig. 19 is a transverse sectional view taken along the lines 19—19 and in the direction of the arrows in Fig. 18;

Fig. 20 is a side elevation of the retarding or aligning mechanism which may be employed;

Fig. 21 is a sectional side elevation of the stacking runways;

Fig. 22 is a fragmentary plan view, certain of the parts being broken away to disclose the underlying construction;

Fig. 23 is a transverse sectional view of the parts as shown in Fig. 22; and

Fig. 24 is a fragmentary side elevation of one of the partition members.

Referring primarily to Figs. 1, 2 and 3, the numeral 25 indicates the main frame of the machine, which frame is provided with suitable bearings 26, within which the ends of shafts are journaled. An extension is arranged adjacent the rear end of the frame and provides a stacking table generally indicated at 27. An extension 28 (indicated in dotted lines in Figs. 2 and 3, and in full lines in Fig. 1) is provided adjacent the forward end of the frame 25, and, for a purpose hereinafter specified, is of any desirable length.

Mounted within the extension 28 of the frame is a shaft 29, which supports a conveyor 30 having lugs 31, this conveyor passing around a shaft 32 journaled in adjustable bearings 33 associated with the frame 25. The shaft 32 is coupled as at 34 with a shaft 35, which latter is journaled in the foremost pair of bearings 26 of the main frame. Passing around this shaft is a conveyor 36 extending throughout the entire length of the main frame portion, this conveyor passing around a shaft 37 which is journaled in this frame and being provided with lugs 38. Positioned below the conveyor 36 is a conveyor 39, which is provided with lugs 40 and passes around a shaft 41 arranged adjacent the forward and lower end of the extension 28 of the frame and below the shaft 29. The rear end of this conveyor passes around a shaft 42 journaled within suitable bearings provided adjacent the rear end of the machine frame and at a point preferably beyond the bearings of the shaft 37. A further conveyor 43 is positioned adjacent the rear end of the machine frame and passes around shafts 44 and 45 mounted the first in advance of the shafts 37 and 42, the other beyond both of these latter shafts. At this time it will be noted that the conveyor 30 overlaps the forward end of the conveyor 36, and that the rear end of the latter is in turn overlapped by the rear end of the conveyors 39 and 43, the last-named conveyor in turn extending beyond the conveyor 39. Thus a construction is provided which might be termed as being in the nature of a bridge, in that no gaps exist between the conveyors, and, consequently, an article placed at the forward end of the machine will be moved throughout the entire body thereof in a manner hereinafter described.

With a view to operating these conveyors a drive 46 extends from a source of power (not shown), and this drive is suitably coupled with the shaft 29, which is in turn connected with the shaft 41 by means of any suitable drive 47. As a consequence, it will be understood—presuming that the shaft 29, as shown in Fig. 2, is driven in a clockwise direction—that the conveyor 30 will have its upper surface moving towards the rear end of the machine. The conveyor 36 will move in a like direction, for the reason that the shafts 32 and 35 are coupled as at 34. The conveyor 39, however, will have its upper or working portion moving towards the forward end of the machine, and the conveyor 43 will be driven to move in the same direction by means of a drive 48, which connects the shafts 42 and 45. Thus a pan placed upon the conveyor 30 will be engaged by the lugs thereof moved towards the rear end of the machine, transferred to the conveyor 36, dropping (in a manner hereinafter stated) onto the conveyor 43, which will transfer to the conveyor 39, this conveyor returning the pan to a position adjacent the forward end of the machine.

It is preferred that the pan-supporting structure be of the nature shown in Figs. 5 and 6, in which a portion of the conveyor 36 and associated mechanism has been shown. In these views the numeral 49 indicates a plurality of connecting links which form the conveyor, and 50 an angle-iron forming a part of the machine frame 25. This angle-iron has one of its legs extending vertically, its other leg extending horizontally and inwardly of the machine. Disposed upon the upper face of this horizontal leg is a pair of longitudinally-extending spaced strips 51 and 52 of a height in excess of the height of the links 49, the conveyor which is formed by the latter riding within the space between these members. Thus a pan 53 will rest upon the upper faces of the members 51 and 52 and will be engaged by one of the conveyor lugs 38, which, in conjunction with a similar lug associated with the second conveyor portion (disposed at the other side of the machine), will serve to feed the pan. In order to establish and preserve the alignment of the pans within the machine it is preferred that a series of flanged wheels 54 be associated with each side of the conveyor. In the present embodiment a pair of these wheels is connected with a shaft 55 adjacent the ends thereof, the flange 56 of the wheel being disposed adjacent the inner face of the vertical arm or leg of the angle-iron 50. The inner edge of this flange is beveled, and a portion of the same will tend to ride into the space extant between the side edge of the pan and the inner angle-iron face aforementioned. To maintain these wheels in position links 57 may be secured one to each of the shaft ends 55, the inner ends of these links being pivotally secured as at 58 to the machine frame. It will be obvious, presuming that a pan is moving through the machine and is off center, that the beveled flange 56 of one wheel will bear against the adjacent side edge of the pan, and that the weight supported by the latter will aggregate the weight of the pair of wheels in addition to the linkage associated therewith. As a consequence, the pan in its travel will be gradually diverted to a central position at which time the flange of the second wheel will come to rest against the opposite side edge of the pan, thus maintaining the central position thereof. In addition to establishing and preserving the alignment of the pans, this structure serves to press the pans into proper face-to-face contact with the members 51, 52, thus preventing a jarring of the pans; and, if one of the pans should be distorted, it will be obvious that this mechanism will serve as a detector readily rendering such fact apparent.

Extending centrally of the machine and longitudinally thereof, as in Fig. 4, is a drive 59, which passes around shafts 60 and 61, its upper face being conveniently arranged in the same plane as that occupied by the conveyor 36. This drive carries lugs 62 extending beyond its body, and, as a consequence, it will be obvious that as the pan moves longitudinally of the machine it will ride over the drive 59 until its forward edge strikes one of the lugs 62, at which time it will operate the member 59 and consequently turn the shafts 60, 61. The first of these latter shafts is connected to a shaft 63 by means of a drive 64. The shaft 63 is coupled with a shaft 65 by means of a conveyor 66 passing around both of these shafts. A shaft 67 is also driven by the shaft 60 by means of any suitable coupling 68. As a consequence, it will be understood that when the forward edge of the pan comes in operative contact with one of the lugs 62 all of this mechanism will be operated for a purpose hereinafter brought out.

Mounted above the path of travel of the upper conveyor face is a shaft 69, to which a plurality of teeth 70 are secured. These teeth, as has been best shown in Fig. 10, are preferably tapered and extend towards the forward end of the machine. If the teeth are permitted to drop their forward edges will ride in contact with the upper faces of the pans as the latter pass thereunder, and thus, any articles (crackers, biscuits, etc.) upon these pans will be diverted by these teeth to ride upon the upper faces thereof. In the present instance these teeth are divided into two series, one to each side of the drive 59, the comb thus provided being interrupted at this point for the purpose of permitting the passage of the lugs 62 associated with this drive.

Stop-members 72 may be associated with the side walls 71 between which the shaft 69 is mounted, and these stop-members co-operate with those teeth which overlie the conveyor, so that in the event of an accidental operation without a pan being in place these teeth cannot fall into contact with the conveyor, which would result in a destruction of the machine parts.

In order to bring the teeth into contact with an upper face of a pan while one of the latter is moving thereunder, and in order to elevate these teeth at the proper instant the following mechanism is utilized: Underlying the rear or pivoted portions of the teeth is a slotted plate 73, which is also pivotally mounted between the side walls 71. Flange members 74 are secured to the under face of this plate and extend to each side of the pans in their passage thereunder. Slidably mounted adjacent one of the side frame members is a pair of rigidly connected bars 75, to the inner of which a spring 76 is attached, serving normally to move the same towards the forward end of the machine. Mounted upon this bar is a stop 77, and a roller 78 is also carried thereby. A shaft 79 mounts a bell-crank providing a pair of fingers 80 and 81, the first of these being engageable with the stop 77, and the second contacting with an adjustable pin 82. A lever 83 is provided with a forked end-portion 84 straddling a shaft 85 journaled in the machine frame, cams 86 being secured to this shaft and the lever and contacting with the downwardly-flanged portions 74 of the plate. A spring 87 has one of its ends attached to the inner bar 75, its opposite end being secured to the upper end of the lever 83 so that the latter is in contact with the roller 78. The rear end of the bar 75 is attached to a lever 88 preferably by means of a flexible connection 89, this lever being secured to a shaft 90' which carries an arm 90, upon which a spring 91 acts. A counterweight carrying arm 92 is also attached to this shaft, a lever 93 being also rotatably mounted thereon, the arms of which extend one to each side of the shaft body. The upper end of this lever pivotally carries a pawl 94, to which an operating member 95 is suitably connected, as has been shown in Fig. 16. The shaft 90' further carries a disk 96 having a ratchet or recessed portion 97, and the side wall of the machine carries an actuating element 98 engageable with the member 95, it being finally noted with respect to this unit of the machine that the lower end of the lever 93 is preferably provided with a roller or other suitable pan-engaging element 99.

As aforestated, the shaft 60 drives the shaft 67. The drive 68, a portion of which has been shown in detail in Fig. 13, carries a lug 100, which is engageable with the lower end of a lever 101 attached to the shaft 79 and being normally retracted by a spring 102, it being noted that the pin 82 is carried by this lever. Presuming that the parts are in the position shown in Fig. 13, in which the comb provided by the teeth 70 is in raised position, the parts will be retained in such position due to the fact that the finger 80 will engage the stop 77 and prevent the bars 75 from being moved under the influence of the spring 76. As a consequence, the lever 83 will be retained in approximately vertical position, and the cams 86 controlled thereby will engage the lower flange edges 74 of the plate 73 to cause the ends of the teeth 70 to extend in a plane above that occupied by the upper faces of the pans. If now the drive 59 is actuated the drive 68 will be moved so that the lug 100 will rock the lever 101, which, acting as a trigger, will throw the finger 80 upwardly, thus permitting the bar 75 to snap to the position shown in Fig. 14. Under this condition the lever 83 will rock, and the cams 86 will be moved to a position at which the plate 73 will fall to such an extent that the ends of the teeth 70 will engage the upper face of a pan, as has been shown in the figure last referred to. If it is desired to return the teeth to their normal position, this may be readily accomplished by simply rocking the lower end of the lever 93 by engagement with a pan towards the rear end of the machine. This will cause the pawl 94 to engage the ratchet portion or recess 97, and a continued movement of the parts will result in the shaft 90' turning, carrying with it the lever 88, which, being connected to the bars 75 by means of the member 89, will retract the former to a point at which the finger 80 is free to drop beyond the rear edge of the stop 77, thus reestablishing the position of the parts, as shown in Fig. 13. It will be noted that the controlling member 98 is so disposed with relation to the actuating-member 95 that upon the parts assuming these positions the pawl 94 will have moved to a point at which it clears the outer edge of the disk 96, so that the parts may again be released by simply rocking the lever 101. It will be obvious that, if desired, a shield 103 may be provided adjacent the actuating-member 95 and pawl 94 so that if the lever 93 is moved suddenly centrifugal force will not cause the former parts to be thrown to an inoperative position, it being obvious that the actuating-member under conditions of this nature will simply strike against the shield, as has been shown in Fig. 14.

Next considering the stripping unit, attention is particularly invited to Figs. 7, 8 and 9. This unit includes a shaft 104 mounted in suitable journals associated with the machine frame or brackets connected with the latter, and this shaft carries disks 105. These disks are notched adjacent their edges as at 106, and brackets 107 are attached to the disks adjacent these notches so that shafts 108 carried by these brackets will come to lie within the notches. Attached to these latter shafts is a series of links 109, to the outer end of each of which stripping members are secured. These members preferably include a body formed of layers 110 of felt or rubber and may be mounted for rotation with respect to the links 109. The shaft 104 is mounted above the teeth 70 and slightly in advance thereof, it being noted, as in Fig. 8, that a shield 111 is preferably provided in advance of the stripping member and extends to a point slightly underlying the same, this shield terminating, however, in advance of the outer ends of the teeth or fingers 70.

As a consequence, presuming that the teeth 70 are in a lowered position, as has been shown in Fig. 8, and engage the upper face of a pan passing thereunder, these teeth will act as scraping or picking fingers to divert the articles from the upper surface of the pan in its passage thereunder. If now the shaft 104 is rotated the stripping members 110 will tend to move outwardly from the periphery of the disks, but will be prevented from uncontrolled movement by means of the shield 111, which will act to such an extent as to break the force of the contact between the pan and articles thereon and the stripping members when the latter finally clear the end of the shield. It will be obvious that the articles the forward ends of which are now riding upon the teeth 70 will be further advanced, incident to the members 110 coming in contact with the bodies of the same and stripping them entirely from the pan and pushing them over the upper edges of the teeth and beyond the same onto a bank of rollers 112, the function of which will be hereinafter more particularly described.

If the first row of articles upon the pan is immediately adjacent the forward edge thereof the teeth 70 might not be lowered quickly enough to drop in advance of this first row, and these articles would, accordingly, not be stripped from the pan. In order to avoid difficulty of this nature a shaft 113 is arranged in advance of the stripping member and carries a series of fingers 114, this structure having been shown in detail in both Figs. 10 and 20. The ends of the fingers extend into the plane occupied by the upper face of the pans, and, as a consequence, these fingers will engage the first row of articles and align them, these fingers, and more particularly the shaft supporting the same, being operated through the medium of an arm 114′ by a cam 114″, as has been shown in Fig. 3. This drive is so timed that the fingers are depressed immediately in advance of the forward edge of the pan, and as soon as this forward edge has ridden slightly beyond the finger ends the shaft 113 will turn to elevate the latter. As a consequence, the teeth 70 will have ample opportunity to drop to their operative position in advance of the first row of articles so that the latter will be effectually stripped from the pan. Likewise, it might occur that the rearmost row of articles upon the pan would, upon engaging the teeth, tend to move rearwardly with respect to the pan, in which event they would be likely to drop off the rear edge of the same. In order to prevent an occurrence of this nature it will be observed that the conveyor 66 carries a shaft 115 which extends between the side members of the conveyor. Mounted upon this shaft is a series of platens 16, and arms 117 extend from the shaft bearings and carry between them a bar 117′. Springs 118 have one of their ends attached to this bar, their opposite ends being attached to the inwardly-extending portions of the platens so that the forward and upper edges of the latter tend to firmly engage the rear edge of a pan. In order to prevent undue movement of the platens a stop-member 119 extends between the shaft bearings and in advance of the platens. As a consequence, the latter will adjust themselves to any irregularity of the rear pan edge. These platens are so disposed that they will ride one between each of the teeth 70, and it will be obvious that if the conveyor 66 is moved in synchronism with the pan and at the proper moment these platens will lie adjacent the rear edge of the pan, as in Fig. 10, and prevent the articles upon the pan from being displaced rearwardly. It will be obvious that the platens are interrupted in line with the central drive 59, and the chain providing this drive may carry a spring-pressed resilient arm 120 at proper intervals, this arm bridging the gap between the platens adjacent the central portions thereof and serving to supplement the platens in forcing articles which are located intermediate the side edges of the pan onto the teeth or picking fingers.

The rollers 112 are connected together by suitable gearing, which is indicated at 112′ and 112″ in Fig. 10 and a motor 121 drives a shaft 122 which is connected as at 123 to drive a shaft 124, this shaft in turn driving a shaft 125 by means of a drive 126, to which one end of the roller shaft is connected by a drive 127, thus assuring an actuation of these members when the motor 121 is in operation. The shaft 104 is driven by the shaft 128 through a drive 129, and the shaft 125 also serves to drive a vertical shaft 130 by means of a bevel gear connection 131. Extending beyond the rollers 112 is a conveyor 132, which passes around rollers 133 and a drum 134, the latter being driven by means of the drive 135.

The conveyor 132 discharges onto a stacking unit, which, as has been particularly shown in Fig. 18, includes chains 136, to the links of which rows of forwardly-inclined ribs 137 are secured, these ribs being spaced from each other and divided into rows by means of partition members 138 extending at proper intervals between the same.

The chain 136 passes around shafts 139 and 140, which latter is driven, as at 141, from the drum 134, a suitable pawl and ratchet or clutch connection 141′ being provided to prevent any continued driving of the parts in the event of a jamming of the articles.

Chutes 142 extend between the ends of the conveyor 132 and the supports provided by the ribs. It will be understood that the partitions 138 are rigidly secured against movement adjacent the stacking unit, but the forward ends of these partitions are reduced as at 143 and overlie the upper face of the apron or conveyor 132, these portions of the partition members being flexible and free to vibrate.

As has been shown in Fig. 1, the upper end of the shaft 130 terminates in a crank-and-pitman connection 144, the end of this pitman being connected to a bar 145 secured to the forward end-portions 143 of the partition members 138. As a consequence, it will be appreciated that when the last-named shaft is operated the ends of the partition members will be given a vibratory movement, and articles upon the conveyor 132 will be diverted to assume a row formation within the channels between these partition members.

Adjacent the rear or delivery end of the conveyor 136 a shaft 146 is mounted, and from which a series of rocking fingers 147 depends, the inner faces of these fingers being curved to approximately correspond to the path of movement of the rear end of the conveyor, and the positions of these fingers being such that the inner faces thereof are spaced from the ribs 137 to an extent sufficient to permit of the passage of one or more thicknesses of articles thereunder. As will be apparent, the provision of means such as the fingers 147 will obviate any possibility of failure of the crackers to be properly positioned upon the inclined surfaces of the blocks 137, since any crackers which might be received in an edgewise position by the blocks will be pushed backwards onto a block surface by the fingers 147. The fingers also act as shields to insure against the crackers falling to a horizontal or an inverted position as the same are carried downwardly to the stacking deck.

The partition members 138 have their rear ends extended as at 148 so that the channels provided therebetween are continued, and at this point a delivery or stacking deck 149 is provided, over and between the partition portions 148 of which a series of conveyors 150 moves. These conveyors pass around drums secured to shafts 151 and 152, these shafts being driven as at 153. The upper face of the stacking deck may be formed with a series of grooves 155, and at this point the rear end portions 148 of the partition members 138 may be formed with tongues 156 for selective engagement with one of these grooves. As a consequence, it will be obvious that the width of the channels within which the conveyors or belts 150 move may be varied to correspond to the size of the articles being handled.

It will be understood that in operation—presuming that this machine is utilized in the cracker- or biscuit-making industry, for which it is primarily intended—pans of crackers or biscuits will be moved down by a vertical conveyor (not shown) and will be transferred to the machine by means of the conveyor 30, the lugs of which will engage the rear end of the pan to effect this result, and these pans will move towards the rear end of the machine and be transferred to the conveyor 36. At this time it will be understood that the reason the conveyor 36 is preferably not utilized to effect a direct transfer of the pans from the vertical or oven conveyor to the machine is that conditions of installation vary, and it is far more simple to alter or rearrange the comparatively short conveyor 30 than would be the case if corresponding changes would have to be resorted to in connection with the conveyor 36. The pan with the articles upon its upper face will now move along the members 51 and 52, incident to the action of the conveyor 36, and, more particularly, the fact that the lugs 38 thereof are engaging the rear edges of the same. Incident to the construction shown in Figs. 5 and 6, or any similar expedient which may be resorted to, the pans are pressed into proper sliding contact with the members supporting the same, and rattling of the parts is reduced to a minimum, aside from the fact that the pans are properly centered. The forward ends of these pans will now engage one of the lugs 62 of the drive 59, and, as a consequence, the shafts connected with the same will be operated. As a result, the drive or chain 68 will be moved, and the lug 100 thereof will engage the lever 101 so as to permit the bar 75 to move to the position shown in Fig. 14. It will be appreciated that the operation of these parts is so timed that the teeth 70 will come to bear against the upper face of the pan immediately to the rear of the forward edge thereof, and, as previously brought out, any articles which lie upon the pan at too advanced a point will be brought to proper position by the aligner provided by the fingers 114. In its continued movement the articles will ride from the upper face of the pan onto the picking members provided by the teeth, and incident to the unit particularly shown in Figs. 7, 8 and 9, they will be stripped from the upper pan face and transferred to the rollers 112. This operation will continue until the forward ends of the teeth lie adjacent the rear edge of the pan and until the last row of articles has been stripped therefrom. In this connection it will be noted that incident to the platens carried by the conveyor 66 and the member 120 carried by the drive 59 the last row of articles will not be displaced rearwardly from the rear edge of the pan, and the elements which effect this result will ride between the teeth 70 to assure a positive forward feeding of the articles upon the upper edges thereof. As soon as this last row of articles is in a position at which it may be effectually engaged by the stripping member, the forward end of the pan will contact with the element 99 of the lever 93 to thus move the bar 75 against the tendency of the spring 76 and return the same to the position shown in Fig. 13, it being noted that upon the bar assuming this position the pawl 94 will be free of the recess 97 so that the parts may again be immediately thrown upon the lug 100 again coming in contact with the lower end of the lever 101.

The pans will continue to move forward upon the conveyor 36 until they reach the ends of the same, whereupon they may strike a deflector 157 and be diverted thereby to engage the conveyor 43, which will assure a positive transfer of the same to the conveyor 39, which will return them to the forward end of the machine, at which point they may be automatically removed.

The articles will be advanced by the rollers 112 to occupy a position upon the apron or conveyor 132, upon which they will be arranged in row formation incident to the vibratory action of the forward ends 143 of the partition members 138. These articles are then delivered from this conveyor onto the chutes 142 and will come to lie upon the forwardly-inclined supports provided by the ribs 137. At this time it will be observed that incident to the construction of these members the rear edges of one group of the same will act as a stop limiting the forward movement of the article supported by the next succeeding group, the articles being supported in inclined position. The fingers 147 will prevent the articles from being displaced from their positions upon the ribs, and these articles will be finally stripped from such position upon reaching a point clear of the lower end of these fingers incident to the provision of a series of plates or members 158 which are mounted intermediate the conveyors 150 and the conveyor 136, these plates or members extending between the individual ribs of the groups in order to effect a positive stripping action. As a consequence, stacking will be initiated, as has been indicated in dotted lines in Fig. 18, and, incident to the forward inclination of the rib groups, these elements will act as cams feeding the rows of stacked articles forward over the members 158. The conveyors 150 are employed in order to prevent too firm a stacking of the articles, and these conveyors move at a speed slightly less than that at which the stacking is initiated, so that while the articles are disposed in compact rows, nevertheless, they will not be subject to the likelihood of breakage. As has been shown in Fig. 1, the central group of belts or conveyors 150 preferably extends beyond the ends of the side groups thereof. This permits of the ready association of an automatic packing machine with the stacked articles upon the table, or, if this operation is performed manually, operators may be conveniently grouped around this deck.

From the foregoing it will be apparent that the articles do not have to be faced in that they are never unfaced, these articles being stripped from the upper faces of the pans and their relationship being preserved throughout their entire passage of the machine.

Finally, it will be understood that the feeding of the pan conveyors is in the present instance effected by the drive 46, and the pans themselves serve to operate the drive 59 which actuates the comb provided by the teeth or picking fingers 70, this drive also actuating the mechanism which prevents the displacement of articles over the rear edge of the pans. As a consequence, the proper timing of these parts will never be disturbed in that it is necessary to utilize pans (which are of a constant and predetermined size) in order to effect an actuation thereof.

The source of power 121 in turn serves to operate the stripping device, the stacking initiator and the conveyors positioned both in advance and to the rear of the same, as well as the rollers 112, and the timing of these parts will also not be disturbed.

In conclusion, it will be understood that the movements of the cams 86 are synchronized and that a single-set operating mechanism serves to actuate both of these cams by virtue of the fact that both shafts 85 carry pinions 159 which mesh with spring-retracted racks 160, these rings having their teeth in engagement with gears 161 mounted upon a common shaft 162. As a consequence, when that shaft 85 with which the lever 83 is associated is rocked the corresponding rack 160 will be moved to impart movement to the shaft 162, and, consequently, the second rack, as well as the pinion associated with the second shaft 85.

Thus, among others, the objects of this invention are accomplished, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A machine of the character described, including, in combination, a frame, a conveyor mounted within said frame and serving to propel an article-carrying pan, a second conveyor mounted below said first conveyor, said conveyors moving in opposite directions, means for removing the articles from said pan, and a shield carried by said frame in a position intersecting the plane of movement of said first-named conveyor and serving to deflect the emptied pan from said first-named to said last-named conveyor.

2. A machine of the character described, including, in combination, a frame, a conveyor mounted within said frame and serving to propel an article-carrying pan, a second conveyor mounted below said first conveyor, said conveyors moving in opposite directions, means for removing the articles from said pan, a further conveyor carried by said frame and having its ends extending beyond the adjacent ends of said conveyors whereby an emptied pan will move from said first-named conveyor onto said last-named conveyor and be transferred thereby to said second conveyor.

3. A machine of the character described, including, in combination, a frame, a conveyor mounted within said frame and serving to propel an article-carrying pan, a second conveyor mounted below said first conveyor, said conveyors moving in opposite directions, means for removing the articles from said pan, said second conveyor having its forward end extending beyond the rear end of said first-named conveyor, a third conveyor extending beyond the forward end of said second conveyor, and a shield carried by the frame of said machine whereby an emptied pan will move from said first-named conveyor and be deflected by said shield onto said third conveyor and be transferred thereby onto said second conveyor.

4. A machine of the character described, including a frame, a conveyor supported by said frame and serving to move pans along the same, means for removing articles from said pan, and a pair of rollers having beveled flange-portions bearing against the side edges of said pan, said rollers being operatively coupled whereby they will tend to divert a pan to a proper relative position with respect to the removing means and at which both of the rollers will equally engage the side edges of the pan.

5. A machine of the character described, including, in combination, a frame, conveyors moving longitudinally of said frame and mounted therein, one of said conveyors carrying a cracker-supporting pan, means for removing said crackers from said pan without disturbing the faced relationship thereof, means for arranging said crackers in row formation, means for stacking said crackers, and means independent of said stacking means for moving the stacked crackers out of the path of crackers being stacked, said last-named means operating at a slower speed than said stacking means.

6. A machine of the character described, including, in combination, a frame, a conveyor mounted by and moving longitudinally of said frame, said conveyor carrying a cracker-supporting pan, means for rearwardly displacing any crackers which extend too far forward upon said pan, and means for removing the crackers from the pan.

7. A machine of the character described, including, in combination, a frame, a conveyor mounted by and moving longitudinally of said frame, said conveyor carrying a cracker-supporting pan, means engaging the crackers to remove the same from said pan, and means to engage the crackers adjacent the forward end of the pan to displace the same to a point at which they may be operatively engaged by the removing means.

8. A machine of the character described, including, in combination, a frame, a conveyor mounted by and moving longitudinally of said frame, said conveyor carrying a cracker-supporting pan, periodically-operated means engaging the upper face of said pan to divert the crackers therefrom, means for stripping the crackers across said diverting means, and means periodically operated to engage the crackers adjacent the forward end of the pan to displace the same to a point at which they may be operatively engaged by the diverting means.

9. A machine of the character described, including, in combination, a frame, a conveyor mounted by and moving longitudinally of said frame, said conveyor carrying a cracker-supporting pan, means for diverting crackers from the upper face of said pan, means for preventing a displacement of the crackers over the rear edge of said pan, and means actuated by said pan for operating said last-named means.

10. A machine of the character described, including, in combination, a frame, a conveyor mounted by and moving longitudinally of said frame, said conveyor carrying a cracker-supporting pan, means for diverting crackers from the upper face of said pan, means for preventing a displacement of the crackers over the rear edge of said pan, and a drive operated by said pan and actuating said last-named means and controlling the position of said diverting means.

11. A machine of the character described, including, in combination, a frame, a conveyor mounted by and moving longitudinally of said frame, said conveyor carrying a cracker-supporting pan, means for diverting crackers from the upper face of said pan, and means for stripping the crackers from said pan and over said diverting means, said stripping means comprising a plurality of loosely connected rigid members adapted to contact with the rear edge of the crackers.

12. A machine of the character described, including, in combination, a frame, a conveyor mounted by and moving longitudinally of said frame, said conveyor carrying a cracker-supporting pan, means for diverting crackers from the upper face of said pan, and means for stripping the crackers from said pan and over said diverting means, said stripping means comprising a shaft and a plurality of cracker-contacting elements swingingly carried by said shaft.

13. A machine of the character described, including, in combination, a frame, a conveyor mounted by and moving longitudinally of said frame, said conveyor carrying a cracker-supporting pan, means for diverting crackers from the upper face of said pan, and means for stripping the crackers from said pan and over said diverting means, said stripping member comprising a shaft and a plurality of cracker-engaging members swingingly connected to said shaft at a point to one side of the axis thereof.

14. A machine of the character described, including, in combination, a frame, a conveyor mounted by and moving longitudinally of said frame, said conveyor carrying a cracker-supporting pan, means for diverting crackers from the upper face of said pan, means for stripping the crackers from said pan and over said diverting means, said stripping member including a rotatable shaft, disks supported thereby, shafts associated with said disks adjacent the peripheries thereof, links swingingly connected to said last-named shafts, and cracker-contacting members secured to the outer ends of said links.

15. A machine of the character described, including, in combination, a frame, a conveyor mounted by and moving longitudinally of said frame, said conveyor carrying a cracker-supporting pan, means for diverting crackers from the upper face of said pan, means for stripping the crackers from said pan and over said diverting means, said stripping member including a shaft, cracker-contacting members movably secured to said shaft, and means for preventing a destructive contact between said members and crackers.

16. A machine of the character described, including, in combination, a frame, a conveyor mounted by and moving longitudinally of said frame, said conveyor carrying a cracker-supporting pan, means for diverting crackers from the upper face of said pan, means for stripping the crackers from said pan and over said diverting means, said stripping member including a shaft, cracker-contacting members movably secured to said shaft, and a shield arranged adjacent said members and restricting the movement thereof to a point adjacent that at which they contact with the crackers.

17. A machine of the character described, including, in combination, a frame, a cracker pan-moving conveyor supported by said frame, means for diverting the crackers from the upper face of said pan, a plurality of fingers, a shaft mounting the same, and means for rocking said shaft at predetermined intervals to cause said fingers to contact with crackers misplaced upon said pan to cause the latter to assume a predetermined position with respect to said diverting means.

18. A machine of the character described, including, in combination, a frame, a conveyor supported by said frame and moving longitudinally thereof, said conveyor serving to propel a cracker-carrying pan, means for removing the crackers from the upper face of said pan, and means for preventing a displacement of said crackers over the rear edge of said pan, said means comprising a baffle extending to the rear of said pan and being independent thereof and a further conveyor for moving said baffle.

19. A machine of the character described, including, in combination, a frame, a conveyor supported by said frame and moving longitudinally thereof, said conveyor serving to propel a cracker-carrying pan, means for removing the crackers from the upper face of said pan, means for preventing a displacement of said crackers over the rear edge of said pan, said means comprising a conveyor positioned adjacent said first-named conveyor, means for driving the same, and means carried by said conveyor and bearing against and extending above the rear edge of said pan.

20. A machine of the character described, including, in combination, a frame, a conveyor supported by said frame and moving longitudinally thereof, said conveyor serving to propel a cracker-carrying pan, means for removing the crackers from the upper face of said pan, and means for preventing a displacement of said crackers over the rear edge of said pan, said means comprising a conveyor disposed adjacent said first-named conveyor and a finger carried by said conveyor and bearing against and extending above the rear pan edge.

21. A machine of the character described, including, in combination, a frame, a conveyor supported by said frame and moving longitudinally thereof, said conveyor serving to propel a cracker-carrying pan, means for removing the crackers from the upper face of said pan, and means for preventing a displacement of said crackers over the rear edge of said pan, said means comprising a conveyor, and a plurality of independent fingers carried by said conveyor and extending adjacent and above the rear edge of the pan.

22. A machine of the character described, including, in combination, a frame, a conveyor supported by said frame and moving longitudinally thereof, said conveyor serving to propel a cracker-carrying pan, means for removing the crackers from the upper face of said pan, means for preventing a displacement of said crackers over the rear edge of said pan, said means comprising a conveyor and means extending adjacent to and above the rear edge of said pan, and means operated by said pan for actuating said conveyor.

23. A machine of the character described, including, in combination, a frame, a conveyor supported by said frame and moving longitudinally thereof, said conveyor serving to propel a cracker-carrying pan, means for removing the crackers from the upper face of said pan, means for preventing a displacement of said crackers over the rear edge of said pan, said means comprising a conveyor, a shaft supported by said conveyor, and a plurality of independent spring-pressed platens mounted upon said shaft and bearing against and extending above the rear edge of said pan.

24. A machine of the character described, including, in combination, a frame, a conveyor supported by said frame and moving longitudinally thereof, said conveyor serving to propel a cracker-carrying pan, means for removing the crackers from the upper face of said pan, means for preventing a displacement of said crackers over the rear edge of said pan, said means comprising a conveyor, a shaft supported by said conveyor, a plurality of independent spring-pressed platens mounted upon said shaft and bearing against and extending above the rear edge of said pan, and means engaged by the forward edge of the pan for actuating said last-named conveyor.

25. A machine of the character described, including, in combination, a frame, a conveyor traveling longitudinally thereof and serving to move a cracker-carrying pan towards the rear end of the same, means for diverting crackers from the upper pan face, means for operating said last-named means, means for stripping the articles from said pan and from said diverting means, a plurality of rolls to the rear of said diverting means, and a conveyor to the rear of said rolls, said rolls serving to transfer the crackers from said diverting means to said last-named conveyor.

26. A machine of the character described, including, in combination, a frame, a conveyor movable longitudinally thereof and serving to move a cracker-supporting pan towards the rear end of the machine, means for stripping the crackers from the upper face of said pan, and means for stacking the last mentioned crackers, said means comprising a conveyor, a plurality of multiple rib blocks mounted upon said conveyor, and means extending between the individual ribs adapted to engage a substantially central portion of the lower edge of the crackers for removing the crackers supported by said rib blocks.

27. A machine of the character described, including, in combination, a frame, a conveyor movable longitudinally thereof and serving to move a cracker-supporting pan towards the rear end of the machine, means for stripping the crackers from the upper face of said pan, a conveyor to the rear of said stripping means, stacking means to the rear of said conveyor and including a plurality of multiple-ribbed blocks, a stacking deck to the rear of said blocks, said deck being composed of a plurality of elements staggered with respect to the ribs of said blocks, at least one of said elements being between and at either side of said ribs, and partition members extending across said deck and dividing the blocks into rows, the forward ends of said partition members extending across said conveyor.

28. A machine of the character described, including, in combination, a frame, a conveyor movable longitudinally thereof and serving to move a cracker-supporting pan towards the rear end of the machine, means for stripping the crackers from the upper face of said pan, a conveyor to the rear of said stripping means, stacking means to the rear of said conveyor and including a plurality of multiple-ribbed blocks, a stacking deck to the rear of said blocks, and partition members extending across said deck and dividing the blocks into rows, the forward ends of said partition members extending across said conveyor, said deck being formed with a plurality of notches, said partition members having extended portions each for selective engagement with one of said notches whereby the width of the channels between said partition members may be varied.

29. A machine of the character described, including, in combination, a frame, conveyors extending longitudinally of said frame and moving in opposite directions, one of said conveyors moving a cracker-supporting pan towards the rear end of the machine, periodically-operated means for diverting the crackers from said pan while the latter is supported by said conveyor, means for preventing a displacement of said crackers over the rear edge of said pan, means for removing the emptied pan from the conveyor initially supporting the same to the conveyor moving in an opposite direction, and a single drive for actuating said conveyors, said diverting and displacement-preventing means being operated by the pan body.

30. A machine of the character described, including, in combination, a frame, conveyors extending longitudinally of said frame and moving in opposite directions, one of said conveyors moving a cracker-supporting pan towards the rear end of the machine, periodically-operated means for diverting the crackers from said pan while the latter is supported by said conveyor, means for preventing a displacement of said crackers over the rear edge of said pan, means for removing the emptied pan from the conveyor initially supporting the same to the conveyor moving in an opposite direction, a single drive for actuating all of said elements, means for stripping the crackers from the upper face of said pan and across said diverting means, a conveyor to the rear of said stripping means, stacking means to the rear of said conveyor, and a second drive connected with said last-named elements for actuating the same.

31. A machine of the character described, including, in combination, a frame, conveyors extending longitudinally of said frame, and moving in opposite directions, one of said conveyors moving a cracker-supporting pan towards the rear end of the machine, periodically-operated means for diverting the crackers from said pan while the latter is supported by said conveyor, means for preventing a displacement of said crackers over the rear edge of said pan, means for removing the emptied pan from the conveyor initially supporting the same to the conveyor moving in an opposite direction, a single drive for actuating all of said elements, means for stripping the crackers from the upper face of said pan and across said diverting means, a conveyor to the rear of said stripping means, stacking means to the rear of said conveyor, a second drive connected with said last-named elements for actuating the same, and a stacking conveyor to the rear of these elements and actuated by said first-named drive.

32. A machine of the character described, including, in combination, a frame, a conveyor for feeding a cracker-carrying pan rearwardly of said frame, means for diverting the crackers from said pan, means for stripping the crackers from said pan and across said diverting means, means for properly positioning said pan upon said conveyor with respect to said diverting means, means for properly positioning and retaining said crackers with respect to said pan, conveying means to the rear of said stripping means, stacking means to the rear of said conveying means, stacking conveyors positioned to the rear of said stacking means, a single driving means operating said conveyor, said cracker-positioning means and said diverting means, and a second driving means for operating the remainder of said elements.

33. An article handling machine, including a frame, a conveyor mounted within said frame for movement longitudinally thereof, mechanisms cooperating with articles moved by said conveyor, and a second conveyor extending beyond the frame body and having its inner end overlapping the adjacent end of the first named conveyor, such conveyors moving in substantial synchronism and transferring articles from one to the other.

34. An article handling machine, including a frame, a conveyor mounted within said frame for movement longitudinally thereof, mechanisms cooperating with articles moved by said conveyor, a second conveyor extending beyond the frame body operatively coupled with the first conveyor to move in synchronism therewith, the adjacent ends of said conveyors overlapping to transfer articles from one to the other, and a drive common to both of said conveyors associated with the second conveyor.

35. A machine of the class described, including in combination, a frame, a conveyor mounted by and movable longitudinally of said frame, a second conveyor disposed within said frame and moving in a direction opposite to the direction of movement of said first conveyor and below the same, a third conveyor disposed substantially in the plane of the second conveyor and having its opposite ends extending to both sides of the planes of termination of the adjacent ends of said first two conveyors, means for driving all of said conveyors in substantial synchronism, and means cooperating with articles disposed upon the pans moved by the first named conveyor for manipulating the same, the pans moving from the rear end of the first conveyor to the third conveyor and being transferred thereby to the second conveyor.

36. A machine of the class described, including in combination, a frame, a conveyor mounted by and movable longitudinally of said frame, a second conveyor disposed within said frame and moving in a direction opposite to the direction of movement of said first conveyor and below the same, a third conveyor disposed substantially in the plane of the second conveyor and having its opposite ends extending to both sides of the planes of termination of the adjacent ends of said first two conveyors, means for driving all of said conveyors in substantial synchronism, means cooperating with articles disposed upon the pans moved by the first named conveyor for manipulating the same, the pans moving from the rear end of the first conveyor to the third conveyor and being transferred thereby to the second conveyor, and a shield disposed adjacent the rear end of the first conveyor and the body of the third conveyor serving to deflect the pans from the former to the body of the latter.

37. An article handling machine, including a frame, a conveyor supported by and movable longitudinally of said frame, article carrying pans disposed for movement by said conveyor, mechanisms associated with said machine for manipulating said articles, and a pair of members, one disposed at either side of said pans, and each adapted to bear downwardly and inwardly against said pans both to press the same towards the conveyor and positively to center them with respect to the machine frame.

38. An article handling machine, including in combination, a frame, a conveyor moving longitudinally thereof, article supporting pans moved by said conveyor, mechanisms associated with said machine and serving to manipulate the articles disposed upon said pans in their movement through the machine, and a pair of conical members bearing one against each of the side edges of the pans in such movement and acting positively to center the said pans with respect to the frame.

39. An article handling machine, including in combination, a frame, a pair of spaced strips disposed adjacent the sides of said frame and extending longitudinally thereof, conveyor members extending within the spaces between said strips and of a height less than the height of the latter, pan engaging elements secured to said conveyor members and extending above the upper edges of said strips, the latter supporting pans moved by said members, and means associated with said frame and cooperating with articles disposed upon the upper face of the pans for stripping articles from the pans while the latter are propelled by the pan-engaging elements.

40. An article handling machine, including in combination, a frame, a pair of spaced strips disposed adjacent the sides of said frames and extending longitudinally thereof, conveyor members extending within the spaces between said strips and of a height less than the height of the latter, pan engaging elements secured to said conveyor members and extending above the upper edges of said strips, the latter supporting pans moved by said members, the width of said pans being less than the distance between the sides of the frame, means overlying the pairs of strips and extending into the spaces extant between the side edges of the pan and the sides of the frame for centering the pans upon said strips, and means associated with said frame for manipulating articles disposed upon the upper pan faces.

41. An article handling machine, including in combination, means for moving an article supporting pan, article diverting means shiftable to rest against the upper pan surface or to extend above the same, and means for controlling the position of such diverting means, and including a cam associated with said diverting means to shift the latter from one position to the other, cam-operating mechanism and means engaged by the pan in its movement to operate said mechanism.

42. An article handling machine, including in combination, means for moving an article supporting pan, article diverting means shiftable to rest against the upper pan surface or to extend above the same, and means for controlling the position of such diverting means and including a cam connected with said diverting means to shift the same to occupy different positions, a bar connected with said cam to move the latter, a setting mechanism controlled by the movement of the pan to shift the bar to a position at which said diverting means extends clear of the path of pan travel, and a releasing mechanism also actuated by the movement of a pan to permit said bar and cam controlled thereby to shift to a position at which said diverting means extends in contact with the upper face of said pan.

43. An article handling machine, including in combination, means for moving an article supporting pan, article diverting means shiftable to rest against the upper pan surface or to extend above the same, and means for controlling the position of such diverting means and including a bar, a cam controlled by the movement of the latter and connected with said diverting means to shift the latter, means normally tending to move said bar to a position at which said diverting means engage the upper surface of a pan, means preventing such movement, and a trigger controlled by the movement of a pan for releasing said bar to permit the same to assume its normal position.

44. An article machine, including in combination, means for moving an article supporting pan, article diverting means shiftable to rest against the upper pan surface or to extend above the same, and means for controlling the position of such diverting means and including a bar, a cam controlled by the movement of the latter and connected with said diverting means to shift the latter, means normally tending to move said bar to a position at which said diverting means engage the upper surface of a pan, means preventing such movement, a trigger controlled by the movement of a pan for releasing said bar to permit the same to assume its normal position, and a setting mechanism also actuated by the pan for returning a bar to a position at which said diverting means clears the plane of travel of the upper pan surfaces.

45. An article handling machine, including in combination, means for moving an article supporting pan, article diverting means shiftable to rest against the upper pan surface or to extend above the same, and means for controlling the position of such diverting means and including a bar connected to said diverting means to shift the same, means tending normally to move said bar to a position at which said diverting means will be in pan engaging position, a trigger mechanism controlled by the movement of said pan to release said bar to assume such position, a re-setting mechanism also controlled by the movement of said pan and connected with said bar to re-establish the position thereof.

46. An article handling machine, including in combination, means for moving an article supporting pan, article diverting means engaging with said pan and including a member presenting a plurality of spaced teeth, and means preventing a displacement of articles over the rear pan edge and including a plurality of upwardly extending platens, said platens being staggered with respect to the teeth to ride between the same.

47. An article handling machine, including in combination, means for moving an article supporting pan, article diverting means engaging with said pan and including a member presenting a plurality of spaced teeth, and means preventing a displacement of articles over the rear pan edge and including a plurality of upwardly extending platens, said platens being staggered with respect to the teeth to ride between the same, a conveyor for mounting said platens, and driving mechanism actuated by the movement of the pan for driving said latter conveyor.

48. An article handling apparatus, including in combination, means for stripping articles from the upper surface of pans, and means for receiving said articles and including a conveyor, said conveyor comprising multiple ribbed blocks, each rib being of substantially less width than the article supported by a block, and members extending into the spaces extant between such ribs and positioned adjacent the delivery end of the block supporting conveyor to receive articles supported upon said blocks, said members presenting a flat surface to the articles received.

49. An article-handling machine, including, in combination, a frame, means to move an article-supporting pan along said frame, means for diverting articles from the upper face of said pan, a conveyor at the rear of said diverting means, stacking means at the rear of said conveyor, a plurality of upwardly-extending sheet-material partition members extending over said stacking means and forwardly over said conveyor, the forward ends of said partition members being flexible, means to mount said partition members at a point to the rear of said flexible ends, and means periodically to vibrate the flexible forward ends of said partition members.

50. An article-handling machine, including, in combination, a frame, means to move crackers horizontally along said frame, stacking means at the rear of said moving means, said stacking means including a plurality of multiple-ribbed blocks, a stacking deck at the rear of said blocks, said deck comprising a plurality of elements staggered with respect to the ribs of said blocks to receive crackers therefrom, and a plurality of partition members removably mounted between pairs of said deck elements.

51. An article-handling machine, including, in combination, means for moving an article-supporting pan, article-diverting means shiftable to rest against the upper pan surface or to extend above the same, and means for controlling the position of such diverting means; said controlling means including a cam associated with said diverting means to shift the latter from one position to the other, cam-operating mechanism, a drive for actuating said cam-operating mechanism, and elements on said drive extending into the path of movement of a pan.

52. An article-handling machine, including, in combination, means for moving an article-supporting pan, means adapted to engage the upper pan surface for diverting articles therefrom, means adapted to engage said articles immediately in advance of said diverting means for shifting the same across the latter and including a plurality of swingingly-mounted article-engaging elements, means for revolubly mounting said elements, and a baffle exending across a portion of the path of downward movement of said elements.

53. An article handling machine, including, in combination, means for moving a cracker-supporting pan, means to divert crackers from the surface of said pan, stacking-initiating means positioned rearwardly of said diverting means and arranged to move said crackers progressively from a substantially horizontal position to a substantially vertical position, and means positioned substantially tangentially of said stacking-initiating means to insure a proper positioning of the crackers thereon.

54. An article handling machine, including, in combination, means for moving a cracker-supporting pan, means to divert crackers from the surface of said pan, cracker-stacking means positioned rearwardly of said diverting means and comprising a conveyor formed with a plurality of blocks having rearwardly-inclined surfaces, and means above said blocks to insure a proper positioning of the crackers thereon.

55. An article handling machine, including, in combination, means for moving a cracker-supporting pan, means to divert crackers from the surface of said pan, cracker-stacking means positioned rearwardly of said diverting means and comprising a conveyor formed with a plurality of blocks having rearwardly-inclined surfaces, and a finger shaped to conform with a portion of the path of movement of said conveyor and disposed at one side of said blocks.

56. An article handling machine, including, in combination, means for moving a cracker-supporting pan, means to divert crackers from the surface of said pan, cracker-stacking means positioned rearwardly of said diverting means and comprising a conveyor formed with a plurality of blocks having rearwardly-inclined surfaces, and a pivotally-mounted finger positioned adjacent the stacking end of said conveyor and extending above and to the rear of said blocks, and means to maintain said finger normally in position to act as a shield for the crackers on the blocks during the stacking-initiating operation.

In testimony whereof I affix my signature.

GEORGE WORRINGTON CAMPBELL.